US008700357B2

(12) United States Patent
Fehrenbach et al.

(10) Patent No.: US 8,700,357 B2
(45) Date of Patent: *Apr. 15, 2014

(54) EVALUATION OF AN ECHO SHAPE OF FILLING LEVEL SENSORS (75) Inventors: Josef Fehrenbach, Haslach (DE); Thomas Deck, Oberwolfach (DE); Roland Welle, Oberwolfach (DE); Karl Griessbaum, Muehlenbach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/463,385

(22) Filed: May 3, 2012

(65) Prior Publication Data
US 2012/0221261 A1    Aug. 30, 2012

Related U.S. Application Data (63) Continuation of application No. 12/428,980, filed on Apr. 23, 2009, now Pat. No. 8,332,182.

(60) Provisional application No. 61/056,180, filed on May 27, 2008.

(30) Foreign Application Priority Data

May 27, 2008  (EP) ..................... 08156996

(51) Int. Cl.
G01F 23/00    (2006.01)

(52) U.S. Cl.
USPC .............................................. 702/166; 702/55

(58) Field of Classification Search
None
See application file for complete search history.

(56) References Cited

U.S. PATENT DOCUMENTS 4,911,014 A * 3/1990 Lund et al. ..................... 73/602
5,689,250 A * 11/1997 Kremser ....................... 340/904

FOREIGN PATENT DOCUMENTS

WO    WO 2006090394    * 8/2006

* cited by examiner

Primary Examiner — John Breene
Assistant Examiner — Timothy H Hwang
(74) Attorney, Agent, or Firm — Fay Kaplun & Marcin, LLP (57) ABSTRACT A transit-time fill-level measuring device for measuring the fill level of a filling material in a container is stated, in which transit-time fill-level measuring device information about the topography of the filling material surface is determined on the basis of the shape of a single echo curve of the receiving signal. From this the fill volume can then be derived.

9 Claims, 7 Drawing Sheets

EVALUATION OF AN ECHO SHAPE OF FILLING LEVEL SENSORS

REFERENCE TO RELATED APPLICATIONS

This application is a Continuation of U.S. patent application Ser. No. 12/428,980 filed on Apr. 23, 2009 now U.S Pat. No. 8,332,182 which claims the benefit of the filing date of EP Patent Application Serial 08 156 996.4 filed on May 27, 2008 and U.S. Provisional Patent Application Ser. No. 61/056,180 filed on May 27, 2008. The disclosure of the above applications is hereby incorporated herein by reference.

FIELD OF INVENTION

The present invention relates to fill level measuring. In particular, the invention relates to a fill-level measuring device for measuring the fill level of a filling material in a container, to a method for determining the fill level of a filling material in a container, to a program element, and to a computer-readable medium.

TECHNOLOGICAL BACKGROUND

For continuous fill level determination in containers that contain, for example, liquids or bulk materials, often sensors are used that, according to the transit-time method, measure the transit time of electromagnetic or acoustic waves from the sensor to the filling material surface and back. If the installed location of the sensor relative to the container bottom is known, the sought fill height can be calculated directly from the distance between the sensor and the filling material surface, which distance is determined from the signal transit time by way of the wave propagation speed.

Acoustic waves are generated and emitted, usually in the form of short pulses, by so-called ultrasound fill-level sensors, predominantly in the region of 10 KHz to 100 KHz by means of electromechanical sound transducers. The reflected sound pulses are evaluated either by the same sound transducer or are received by a second sound transducer, which is designed only for receiving, and said sound pulses are evaluated as far as their transit time with reference to the point in time of transmission is concerned.

Electromagnetic waves that can be in a frequency range of between approximately 0.5 GHz and 100 GHz are emitted by the sensor usually by way of antennae and are received back. Such sensors are usually referred to as radar fill-level sensors. Apart from this, devices are known that guide the wave along a waveguide from the sensor to the filling material and back. The reflection of the waves from the filling material surface is based on changes in the propagation impedance for the wave at this location. These devices are also referred to as radar fill-level sensors or, more frequently, as TDR (time domain reflectometry) sensors.

However, it is often difficult to unambiguously distinguish the filling material reflection from all the other echoes.

Furthermore, the shape of the echoes of the filling material is often not the same as a reflection from a flat homogeneous surface would be imaged. This poses the problem of stating, from the found echo of the filling material surface, an unambiguous distance between the sensor and the filling material, and from this of stating a discrete value of the quantity of product contained in the container. This applies less to transit-time measuring in liquids containers, but the problem almost always poses itself in bulk material applications.

However, from the point of view of a user, often an indication of the true fill volume is of interest. In certain cases a knowledge of the topography of the bulk material surface is also useful to the user.

It would be desirable to achieve a spatial resolution of a radar reading, and to improve this resolution to the extent that a three-dimensional image of the reflector (bulk material surface or filling material surface) can be generated.

From DE 10 2005 011 686 A1 a method for measuring the fill level of a medium provided in a container, which method is based on the radar principle, is known in which the measuring signal is emitted to a multitude of different regions, and the reflected components of the measuring signal are received at a multitude of receiving locations. In this way in relation to defined resolution cells in several spatial directions a reflection space to the filling material is to be determined. All the resolution cells together thus provide an image of the three-dimensional topology of the surface of the medium.

From DE 10 2005 011 778 A1 a method for measuring the fill level of a medium provided in a container, which method is based on the radar principle, is known in which the reflected component of the measuring signal is evaluated in a phase-sensitive way, wherein the radar measuring signal is generated by various individual antennae for determining various spatial directions.

From WO 2006/090394 it is known, with the use of an array comprising several sound transmitters or sound receivers, to generate a three-dimensional image of the filling material surface.

Such methods for determining a three-dimensional image of a filling material surface often require relatively great expenditure relating to the mechanics and/or electronics in order to obtain the distance information in various resolution cells. Mechanical movement of the antenna requires servomotors, energy and maintenance. The alternative with group antennae requires considerable expenditure and time relating to signal processing for the phase-sensitive evaluation of the various receiving signals.

SUMMARY OF INVENTION

The present invention relates to determination of the topography of a filling material surface for a transit-time fill-level sensor.

The described exemplary embodiments equally relate to the fill-level measuring device, to the method, to the program element and to the computer-readable medium.

According to an exemplary embodiment of the invention, a fill-level measuring device for measuring the fill level of a filling material in a container is stated, which fill-level measuring device comprises a receiver for receiving a signal reflected by the filling material surface, and a computing unit for determining information about the topography of the filling material surface on the basis of the shape of the receiving signal.

In other words, from the shape of the reflection from the bulk material, certain statements relating to the shape of the surface of the filling material are derived. For this purpose individual echo curves are suitable that are generated with transit-time sensors comprising simple combined transmitting- and receiving antennae. Also suitable for this are a multitude of echo curves comprising more elaborate readings in various resolution cells. In particular, the topography information may be derived from the shape of an individual echo signal curve.

It is not a matter of measuring individual resolution cells as far as the reflector distance is concerned, but rather of evaluating echo shapes (as far as their shape is concerned) in one or several resolution cells, and from this of extracting information about the reflector surface. From this extracted information it may be then possible to make a statement as to whether a charge cone, a discharge funnel or an approximately flat filling material surface is present at the time. Furthermore, the height of a charge cone or the depth of a discharge funnel in the filling material can be approximately determined from the echo shape may. With a known container geometry the evaluation of the echo shape also make it possible to make a statement concerning the fill volume, and in cases where the filling material density is known also concerning the mass of the contents of the container.

In the case of liquid filling materials, by way of the echo shape, it may also be possible to determine the tilt angle of the container at the time. This is of interest in particular for applications in mobile containers or transport silos. In this way the precise fill level can be calculated even if the container is tilted, in that the tilt angle and the container geometry are taken into account in the fill level calculation. Furthermore, by way of evaluation/analysis of the echo shape it may be possible to identify incorrect readings which would otherwise falsify the measuring results. Such incorrect readings can, for example, arise when a transport silo is tilted by 90°.

According to a further exemplary embodiment of the invention, the fill-level measuring device is designed as a transit-time fill-level sensor. For example, it is an ultrasound fill-level sensor, or a fill level radar that applies, for example, the pulse radar method.

According to a further exemplary embodiment of the invention, the computing unit is designed to determine the information concerning the topography of the filling material surface on the basis of the shape of an echo curve of the receiving signal.

According to a further exemplary embodiment of the invention, the fill-level measuring device is a fill level radar that carries out fill level measuring on the basis of a pulse radar method, wherein the computing unit is designed to determine the information concerning the topography of the filling material surface on the basis of an envelope of the receiving signal.

According to a further exemplary embodiment of the invention, the fill-level measuring device is a fill level radar that carries out fill level measuring on the basis of an FMCW principle, wherein the computing unit is designed to determine the information concerning the topography of the filling material surface on the basis of an amplitude profile of the receiving signal.

According to a further exemplary embodiment of the invention, the computing unit is designed to determine the height of a charge cone or the depth of a discharge funnel of filling material inside to container on the basis of the length of the echo band in the filling material reflection of an individual echo curve.

According to a further exemplary embodiment of the invention, the computing unit is designed to determine information concerning the topography of the filling material surface while utilising additional information about the measuring environment.

This additional information can, for example, comprise details concerning the container, the filling material and the installed location of the sensor.

According to a further exemplary embodiment of the invention, a memory unit for storing the additional information is provided, wherein at least some of this additional information is entered manually by a user.

According to a further exemplary embodiment of the invention, the computing unit is designed to determine the height of a charge cone or the depth of a discharge funnel on the basis of several echo curves that have been received at various points in time but that otherwise correspond.

According to a further exemplary embodiment of the invention, the computing unit is designed to determine the information about the topography of the filling material surface on the basis of several echo curves of the filling material surface, which echo curves have been received at various points in time but which otherwise correspond, wherein the transmission signals that correspond to the echo curves in each case have been generated with different sensor parameters.

For example, the different sensor parameters are the frequencies of the emitted transmission signals and/or the polarisations of the emitted transmission signals.

The changes in the echo shape at the various frequencies make it possible to make an improved statement concerning the topography of the filling material surface.

According to a further exemplary embodiment of the invention, the transmission signals that correspond to the echo curves have been generated with the use of different antennae. In this manner the resolution for presenting the topography of the filling material surface can be further increased.

According to a further exemplary embodiment of the invention, a method for determining the fill level of a filling material in a container is stated, in which method a receiving signal reflected by the filling material surface is received, and thereafter information about the topography of the filling material surface is determined on the basis of the shape of the receiving signal.

According to a further exemplary embodiment of the invention, a program element for determining the fill level of a filling material in a container is stated, which program element, when executed on a processor, instructs the processor to carry out the process steps described above.

According to a further exemplary embodiment of the invention, a computer-readable medium for determining the fill level of a filling material in a container is stated, on which medium a program element is stored which, when executed on a processor, instructs the processor to carry out the process steps described above.

Below, exemplary embodiments of the invention are described with reference to the figures.

DETAILED DESCRIPTION OF EXEMPLARY EMBODIMENTS

The illustrations in the figures are diagrammatic and not to scale. In the following description of the figures the same reference characters are used for identical or similar elements.

Figure 1:
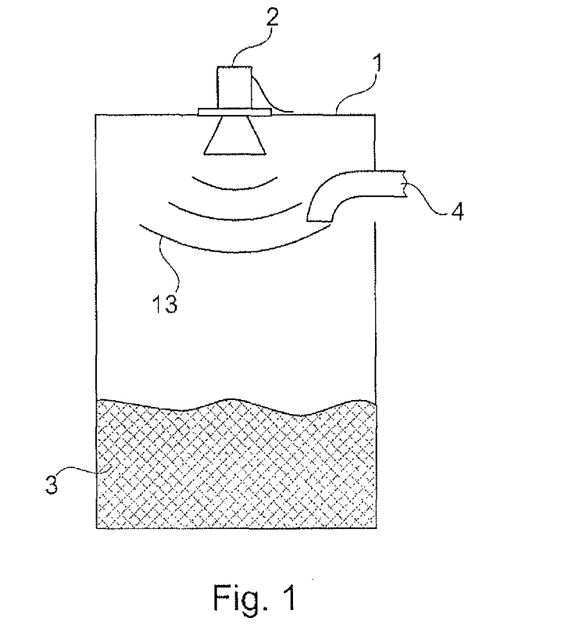
FIG. 1 shows a diagrammatic view of a measuring environment with a fill level sensor according to an exemplary embodiment of the present invention.

FIG. 1 shows a diagrammatic view of a measuring environment with a fill level sensor according to an exemplary embodiment of the invention.

Bulk materials seldom form plane, flat, smooth surfaces, but instead mostly more-or-less uneven surfaces. Filling of the containers can result in charge cones. Emptying of containers often results in discharge funnels in the bulk material. The resulting echoes of transit-time sensors therefore do not have a standard echo shape as known from the reflection from a flat surface that is situated so as to be perpendicular to the direction of wave propagation. Instead, the echoes of the bulk product surface, which echoes are the result of a large number of individual reflections, are considerably longer and are not uniform in shape, which is why in this context the term echo bands is used.

If from such an echo band a defined fill level in the container is to be derived, the question as to which "height line" best represents the "mountainous appearance" of the bulk material surface. For example, a filling material sensor can orient itself by the beginning of the echo band, which may result in a tendency to indicate the peaks of the charge cone as the fill level.

Radar sensors can apply various functional principles, of which in particular the following two, namely the pulse radar method and the FMCW method, may be used in fill level measuring.

The pulse radar method generates short coherent microwave pulses, so-called bursts, and determines the direct time period that elapses between emitting and receiving the pulses. With normal measuring distances ranging up to a few metres, the time periods to be measured are extremely short, and for this reason in the case of pulse radar sensors the received echo signal is expediently slowed down by a time transformation method.

The above method returns a slowed-down echo signal that corresponds to the received high-frequency transmission and receiving signal, but that, for example, is slowed-down by a factor of between 10,000 and 100,000.

A carrier oscillation frequency of the microwave pulse of, for example, 5.8 GHz is transformed to a carrier oscillation frequency of the slowed-down echo pulse of between, for example, 58 kHz and 580 kHz. This signal, which has arisen internally as a result of time transformation is generally also referred to as an intermediate frequency signal or IF signal, which is generally somewhere between 10 kHz and 1 MHz, for example between 50 kHz and 200 kHz. As already mentioned, this IF signal is a slowed-down image of the progression over time of the microwave pulses that have been transmitted and received. Both as far as the frequency range and the character of the amplitude gradient are concerned, the IF signal of the pulse radar method and the echo signal of the ultrasound method are very similar, so that the further processing and evaluation of these signals for determining the relevant echo transit time and thus the measuring distance is identical except for some slight differences. By way of, for example, two-way rectification and filtering of the IF signal or of the ultrasound echo signal, an envelope can be generated. This envelope can be interpreted as a reflection profile of the filling material container, projected over the transit time or the distance. After corresponding digitalisation, it provides the basis for determining the filling material reflection and the associated transit time sought.

The method according to the FMCW principle (FMCW=frequency modulated continuous wave) is the second important radar method. It is based on transmitting a continuous microwave signal whose frequency changes in a linear manner, which microwave signal, after the transit time to the reflector and back, arrives back at the sensor. From the transmitted and the received signal the differential frequency signal is formed, the frequency of which is directly proportional to the sought transit time. In order to obtain information concerning the distance and amplitude of all the echoes where several reflectors are present, the differential frequency signal formed in the time domain is usually subjected to a transformation to the frequency domain. In this process the FFT (fast Fourier transformation) is the preferred approach. The transformation results in an amplitude profile that is projected over the frequency and thus at the same time represents the reflection profile over the transit time or distance. It is thus directly comparable to the envelope of the pulse transit-time sensors.

Thus all the transit-time fill-level sensors considered in this discussion may have a common feature in that they form and evaluate a reflection profile in the shape of a gradient of the reflection amplitude projected over the distance. However, this reflection profile, often also referred to as an echo function or echo curve, usually not only contains the echo of the filling material but also further echoes, for example of container installations, walls, the container bottom, or multiple reflections from the filling material.

It is often difficult to unambiguously differentiate the filling material reflection from all the other echoes. For example, from reflection profiles or echo curves it is possible to form echo lists with several echoes and their relationship correlations among each other; by means of tracking devices a history can be allocated to the current echoes; and by means of this information, a decision can be made as to the position of the echo function, at which position the echo of the filling material surface is situated.

In the case of a radar sensor with a fixed antenna it may be possible to define a three-dimensional resolution cell within which individual reflectors can no longer be differentiated by evaluation of the radar measuring signal. It can be stated that, approximately, a spatial extension of the resolution cell in a defined spatial direction perpendicular to the wave propagation direction is proportional to the wavelength and to the reflector distance or distance from the resolution cell, and conversely, is proportional to the antenna aperture (in other words the effective antenna area) in this spatial direction. It is known that in the direction of wave propagation the depth of the resolution cell depends on the measuring bandwidth used. The spatial position of the resolution cell is characterised by the spatial angle relative to the antenna.

Consequently, if the distance from the antenna is known, an improvement in the spatial resolution by reducing the size of the resolution cell may be achieved by reducing the wavelength, increasing the antenna aperture, and increasing the measuring bandwidth. While this step towards the smallest possible resolution cell is a prerequisite to achieving as detailed as possible a recording of the spatial structure of the reflecting object, it is not adequate on its own. In addition it may be necessary to measure in several different resolution cells whose results provide information about the topography of the reflector surface only in combination. If the resolution cells are smaller than the illuminated reflector, in radar parlance this is referred to as microwave imaging. The quality of such imaging is characterised by the ratio of resolution cell to reflector object size. Information about the various aspects of microwave imaging is provided in the (German-language) book Radartechnik, Springer-Verlag, 1989, Jürgen Detlefsen, and in Radar Handbook, second edition, McGraw-Hill, 1990, Merrill Skolnik. The methods, described therein, of general radar technology in producing three-dimensional images of reflectors can in principle also be applied to fill-level measuring techniques.

In order to be able to take a reading in several different resolution cells, a number of measures to modify known radar sensors with fixed antennae can be taken. All these measures aim in some way or other to vary the spatial angle of the wave propagation direction of the transmitted wave and/or the received wave in order to obtain distance information in various resolution cells.

In one case this means that the antenna is mechanically moved to various positions in order to measure in each position a determined resolution cell. In the case of a combined transmitting- and receiving antenna the position change applies of course at the same time to transmitting and receiving. In the case of separate transmitting- and receiving antennae the positions, instead of being changed together, can of course also be changed separately. This approach of positional change, known from scanners, can, for example, be carried out line-by-line, in a circular or spiral form in one plane, but it can also be extended in any desired manner over an entire space.

This approach is closely related to the SAR (synthetic aperture radar) method known in radar technology. In this method the receiving signals of an antenna that is moved in a linear manner with a radar beam aligned so as to be perpendicular to the direction of movement are evaluated in a suitable signal processing device such that the resolution in the direction of movement can theoretically be increased up to an unsharpness region in the order of magnitude of the aperture of the antenna used. As an alternative to positional change, mechanical rotation of the antenna on any axis at the same location is also suitable for examining different resolution cells.

Instead of mechanically moving the antenna, its direction of emission can also be varied electronically. Group antennae that comprise several individual radiators are particularly suitable for this. By superimposing the individual receiving signals, taking into account the phase position, depending on the setting of the mutual phase shift, the direction of radiation of the overall antenna can be set.

Sensors that in a general form use several antennae distributed at different positions are closely related to the principle of using group antennae. By using as many combinations as possible of transmitting and receiving individual antennae a large number of different resolution cells can be examined. Their results taken together and evaluated accordingly result in a three-dimensional image, of more or less resolution, of the reflector surface.

According to an exemplary embodiment of the invention, by means of a single echo curve, from the length of the echo band of the filling material reflection the height of the charge cone or depth of the discharge funnel is directly determined. Furthermore, from a comparison of the echo amplitudes at various positions within the echo band of the filling material surface, a decision can be made whether there is a charge cone, a discharge funnel or an irregular surface of the filling material. From this information that is then available, it is possible, on the one hand, to determine a good approximate value for the filling material volume, or if the filling material density is known also of the filling material mass, and, on the other hand, data can be generated for diagrammatic display of the filling material surface, e.g. in a process control system.

The reliability and accuracy of the described measuring results may be improved in that additional information about the measuring environment is provided to the transit-time sensor. This can, for example, take place by the parameterising of the sensor by a user, or by factory presets according to customer details provided. This additional information can, for example, relate to details concerning the container, the filling material or the installed location of the sensor. In this context, among other things the following are of interest: container shape; container size; type and position of filling; type and position of emptying; installed location of the fill level sensor; alignment of the sensor; type, grain size and relative permittivity value of the filling material.

In a further exemplary embodiment of the invention, by means of several echo curves that were registered at different points in time but that are otherwise identical, additional information is obtained which facilitates the above-described statements about charge cones, discharge funnels, their height and depth, and the fill volume. As additional information from several echo curves, for example, the movement and the direction of movement of the filling material can be determined. Movement of the filling material in the direction of the container top would indicate filling and an increased probability of a charge cone. Conversely, in the case of the reflector surface moving away from the sensor, the formation of a discharge funnel is to be assumed. A further option of obtaining additional information consists of manually entering details concerning particular fill states, which entries are stored by the sensor. For example, during a one-off filling- and emptying cycle, at defined points in time entries concerning the shape of the filling material surface and the filling volume can be made. For each entry the sensor stores the shape of the echo of the present echo curve. From this a data record of information that has been entered and of associated echo curves or echo shapes arises. In the further course of fill level measuring the sensor can then access this data record and by comparing the echo curve present at the time with stored echo curves it can find the curve with the best match. Depending on the degree of matching, the associated information then also applies to fill level situation at the time.

In a further exemplary embodiment of the invention, evaluation of the echo shape of the filling material surface takes place by means of several echo curves. In this arrangement the echo curves are generated with changed sensor parameters. It is thus imaginable, for example, to vary the frequency of the emitted wave that is received back. With the use of the same antenna, the angle of reflection is thus varied, and different resolution cells are illuminated. From the change in the echo shape at the various frequencies, an improved statement concerning the topography of the filling material surface is possible.

The above applies similarly to the use of several antennae. For example, the use of two antennae suggests itself; namely of a relatively focused antenna and an antenna with a wider angle of emission. The antenna with a wide angle of emission is very suitable for determining the height of the bulk layer, while the focused antenna allows very good decisions as to whether a charge cone or a discharge funnel is present.

Antennae with elliptic illumination zones, wherein the main axes of the antennae are, for example, rotated by 90°, can in this way be advantageously evaluated.

Likewise, for particular applications it may be advantageous to rotate polarisation of the transmitted wave, for example by 90°, or to alternate between linear and elliptic or circular polarisation. Thus the reflection of the wave from a surface that does not extend at a right angle to the direction of propagation can generate different echo shapes depending on the polarisation direction at which the wave impinges relative to the inclination of the surface. Likewise, different echo shapes can result depending on whether the wave is polarised in a linear way or in a circular way. Consequently, measuring with different polarisation and comparing the echo shapes make it possible to gain further knowledge about the filling material surface.

FIG. 1 shows a typical application for the use of the method according to the invention. The fill-level measuring device 2 that is installed in the ceiling region of a container 1 and that operates according to the transit-time method emits signals in the direction of the medium 3 to be measured. The emitted waves 13 are reflected both by the medium 3 to be measured and, depending on the measuring environment, also by container installations 4 and are then received back at the fill-level measuring device 2. The fill-level measuring device 2 itself again comprises several individual components which in cooperation represent a device that is suitable for implementing the method according to the invention.

Figure 2:
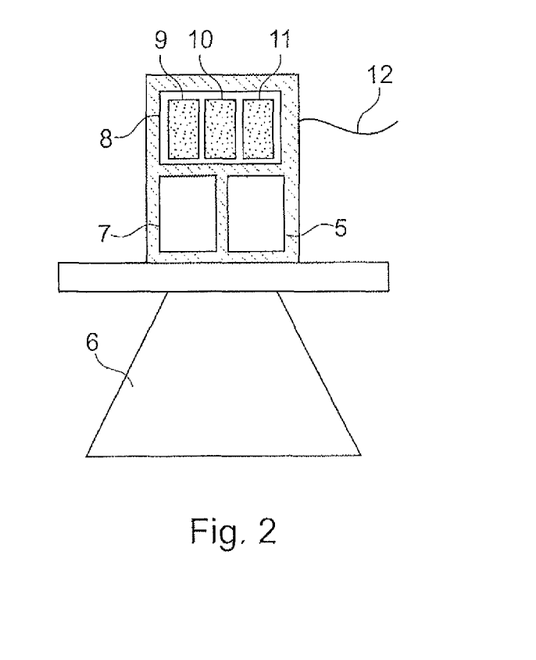
FIG. 2 shows a principal design of a transit-time fill-level sensor according to an exemplary embodiment of the present invention.

FIG. 2 shows the principal design of a transit-time fill-level sensor 2 by means of which the method according to the invention can be implemented. Ultrasound signals or high-frequency signals generated by a transmission device 5 are emitted, by way of a sound transducer or the antenna 6 of the fill-level measuring device 2, as a wave in the direction of the medium 3 to be measured. After a transit time that depends on the distance, the wave components reflected by the medium 3 and if applicable reflected by other devices 4 are received back at the sound transducer or the antenna 6, are converted to electrical signals, and are forwarded to a receiving- and processing unit 7. Within the receiving- and processing unit 7 the signal frequency may be converted, and the signals are subsequently, in a way that is known, filtered, if applicable demodulated, logarithmised and transformed to binary representation by means of an analogue-to-digital converter.

The digitalised receiving signal obtained in this way is subsequently stored in a volatile memory 9 of the evaluation unit 8. In the case of pulse transition-time sensors this sequence of digital values represents the reflection amplitude over the distance, in brief referred to as the echo curve. In the case of FMCW radar sensors, additional transformation of the scanned values in the form of a fast Fourier transformation (FFT) is necessary in order to arrive at a comparable echo curve. The evaluation unit 8 (also referred to as the computing unit) analyses the transmitted echo curve and from it determines information about the current position and the shape of the surface of the medium 3 to be measured. To this effect the evaluation unit 8, apart from its volatile memory 9, comprises a non-volatile memory unit 10 for storing the processing specifications, as well as a processor unit 11 for implementing the method. As a result of the analysis, with a knowledge of particular container data, finally a fill level and/or a fill volume and/or the filling material of the container results. As a further result a three-dimensional image of the filling material surface is possible. All the measuring results can then be presented directly on a display of the sensor, and/or by means of a communication connection 12, for example a 4-20 mA line with superimposed digital signal transmission, can be made available to a higher-order control device.

The digitalised echo curve provided by the receiving- and processing unit 7 is the starting point of the analysis according to the invention, which analysis is to be carried out by the evaluation unit 8.

Figure 3:
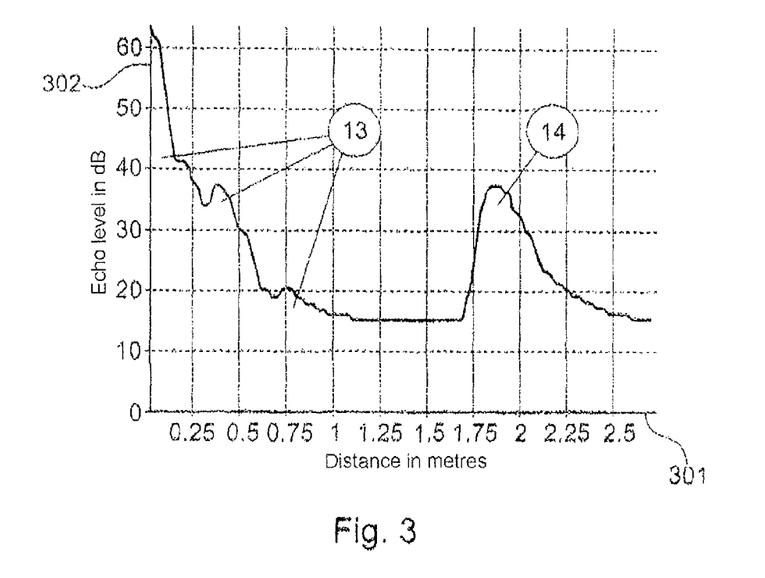
FIG. 3 shows an echo curve of a transit-time fill-level sensor according to an exemplary embodiment of the present invention.

FIG. 3 shows an example of such a digitalised echo envelope of a pulse radar sensor as it arises with an application according to FIG. 1. The diagram shows the echo amplitude 302 in dB as a logarithmic value projected over the distance to the sensor 301 in metres.

As is evident in FIG. 3, the echo curve shown has a visually distinct echo 14. It is at a distance of approximately 1.80 m and arises as a result of reflection from the surface of the filling material 3. The echo image 13 in the near field is composed of several reflections that are caused by the transmitting device itself, by internal reflections in the high-frequency electronics part, and by the reflection of the emitted pulse at the pipeline 4 shown in FIG. 1. With the use of known methods for false-echo suppression, this echo is recognised by the evaluation unit 8 as being a false echo and is therefore not further taken into account in the evaluation of the information concerning the filling material surface.

Figure 4A:
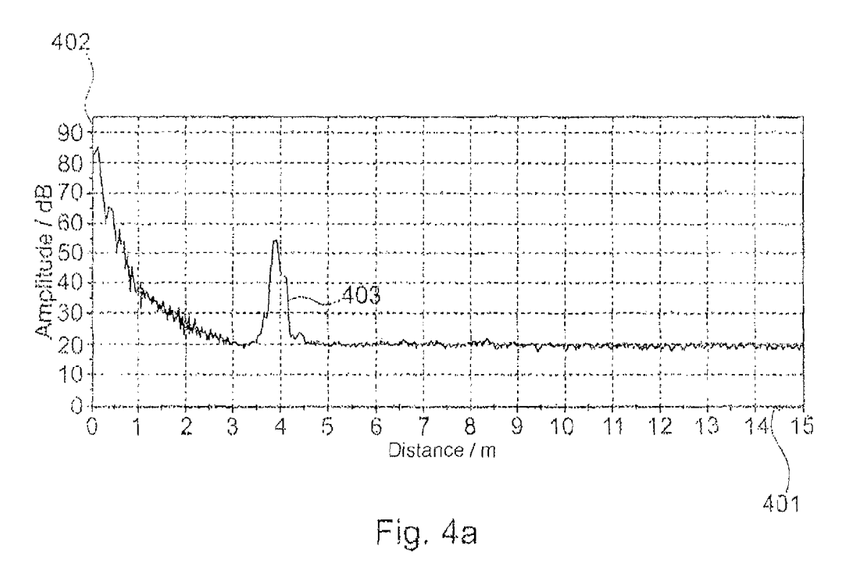
FIGS. 4a, 4b and 4c show various echo curves of a pulse radar sensor according to an exemplary embodiment of the present invention.
Figure 4B:
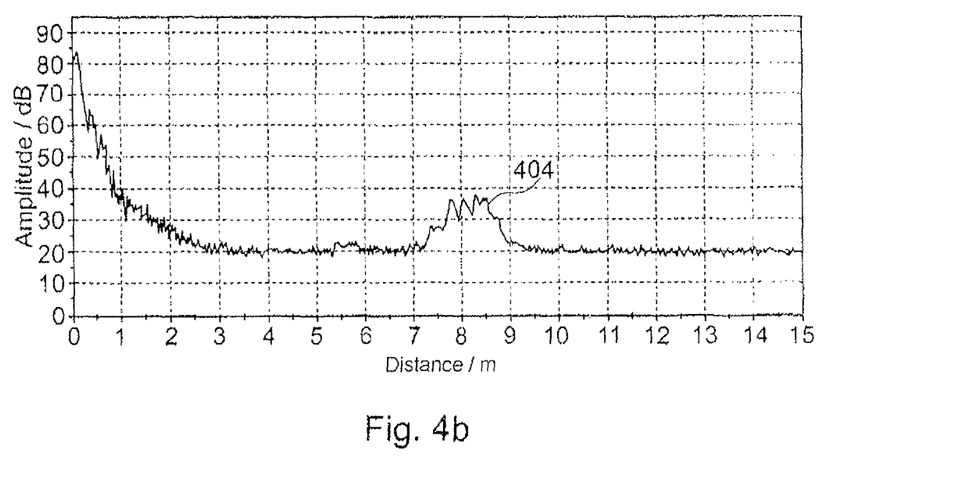
Figure 4C:
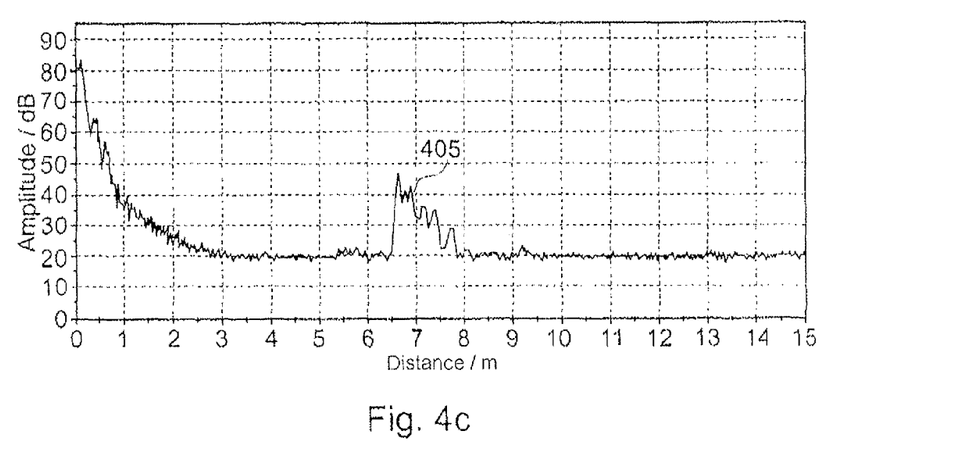

FIGS. 4a, 4b and 4c show different echo curves of a pulse radar sensor that is installed on a container filled with sand. The vertical axis 402 again designates the amplitude, which in this example assumes values of between approximately 20 dB and 85 dB. The transverse axis 401 again designates the distance to the filling material in metres.

The curve in FIG. 4a shows a relatively short echo 403 of the filling material surface at a measuring distance of approximately 4 m. In comparison to this, the echoes 404, 405 of the filling material surface in FIGS. 4b and 4c are clearly longer. According to the invention, the following information about the filling material surface can then be determined from the echo shape:

The length of each echo may directly indicate the height of the bulk position. In relation to the echoes of FIGS. 4b and 4c a height difference between the lowest and the highest surface components of approximately 1.5 m is indicated. In FIG. 4a the echo length is approximately 0.5 m. If one takes into account that an ideal echo of a flat surface with the present sensor is approximately 0.3 m in width, from this echo shape it can be deduced that the filling material surface in the case of FIG. 4a has only a few uneven areas.

Apart from the height of the bulk position, the echo shape further allows conclusions to be drawn as to whether the surface is rather in the shape of a charge cone of a previous filling action, or a discharge funnel of a filling material removal. Thus the echo band in FIG. 4b shows that the amplitude has a tendency to rise between approximately 7 m and 9 m. In contrast to this, in FIG. 4c the echo amplitude is at its maximum at the beginning of the echo and tends to decrease thereafter. An amplitude that increases from the beginning to the end of the echo is generally due to a discharge funnel in the filling material surface, while in the opposite case a charge cone is present. This can be explained in that the reflection components that are large as far as the amplitude is concerned stem from the reflector region that is situated directly in the axis of the main direction of propagation of the antenna. Fill level sensors are usually installed so that the main direction of propagation points towards the centre of the container. In contrast to this, the components of the filling material surface near the container walls generate smaller reflection amplitudes. Consequently it can be deduced that within an echo band the components with a high amplitude have originated from the main direction of radiation of the antenna, thus normally from the centre of the container, while the components with low amplitude are associated with the edge regions of the surface. Thus from the echo distance that is read for the large echo components the fill height is in the centre of the container, while the echo distance of small reflections indicates the position of the surface in the edge regions. In the context of the example shown in FIG. 4b this means that the filling material surface in the centre of the container is at approximately 8.5 m distance from the sensor, while the edge regions are at a distance of only approximately 7.2 m. In contrast to this, from the echo band of FIG. 4c, for the centre of the container a filling material distance of approximately 6.5 m is determinable, and for edge regions a distance of approximately 8 m is determinable. From this information a rough image of a filling material surface can be constructed for a particular case, which image in the simplest case divides the container into centre regions and edge regions with the distances stated above and with the continuous transitions in between.

Furthermore, if the topography of the filling material surface is at least roughly known, it may be possible to indicate a fill level for the case in which the filling material surface would be completely flat as a result of smoothing out all the uneven areas while the content of the container remains unchanged. When the container geometry is known, the volume of the filling material held in the container can be derived in a simple manner from this. In the simplest case this takes place in that an ideal charge cone or discharge funnel of the predetermined height/depth h and a base area according to the cross-sectional area of the container are assumed. The volume of a cone is calculated from the base area multiplied by the height divided by 3. In the case of a charge cone this sought fill level is at a distance that is calculated from the distance of the cone tip plus ⅔ times the cone height. In the case of a conical discharge funnel, ⅔ times the funnel depth is to be subtracted from the distance of the deepest position of the funnel. This is equivalent to adding ⅓ times the height to the distance of the deepest position of the funnel.

As already indicated, the decision as to whether a funnel or a cone is present is derived from the echo shape by a comparison of the position of the maximum within the echo band of the bulk material surface with the position of the echo beginning A and of the echo end E. If the maximum is closer to the beginning than to the end, a charge cone is assumed; conversely a funnel is assumed. The height h is derived from the length of the echo band, i.e. the distance between the echo beginning A and the echo end E. By introducing a form factor f that characterises the echo shape by a numeric value of between 0 and 1 a simple mathematical determination of the distance value s, which represents the fill volume, from the sensor to the filling material surface can be indicated:

$$s = A + \frac{1}{3} * h * (1 + f)$$

wherein
s=distance between the sensor and an assumed flat filling material surface;
A=distance between the sensor and the beginning of the echo band from the filling material;
h=height of the filling material surface, determined from the length of the echo band, i.e. the distance between the echo beginning and the echo end; and f=form factor relating to the echo band. The form factor has the value 1 in the case of a charge cone, and the value 0 in the case of a discharge funnel. The value 0.5 denotes a flat surface.

Instead of determining the form factor f only with the extreme values 0 and 1 and perhaps with an intermediate value 0.5, it may be advantageous to state the form factor as a continuous value between 0 and 1. This can happen in a simple way in that the relative position of the maximum within the echo band is determined. To this effect, for example, the difference between the distance of the end of the echo band and the distance of the maximum is divided by the length h of the echo band. In the case of a charge cone this results in values near 1, while in the case of a discharge funnel the value of this form factor is close to 0.

Another possibility of determining the form factor is based on determining the centre of the echo curve of the echo band. The relative position of the centre within the echo of the filling material surface leads to the form factor in that the difference between the echo end and the distance value of the centre divided by the echo length h again results in the desired value between 0 and 1.

A third method for determining the form factor is based on an area comparison under the echo curve within the echo band of the bulk material. The area of the first half is compared with the area of the entire echo band. Mathematically this can take place by forming the sum of the envelope values between the echo beginning and the echo middle on the one hand, and by adding up the values between the echo beginning and the echo end on the other hand. The ratio of the two sums directly results in the form factor f.

Figure 5A:
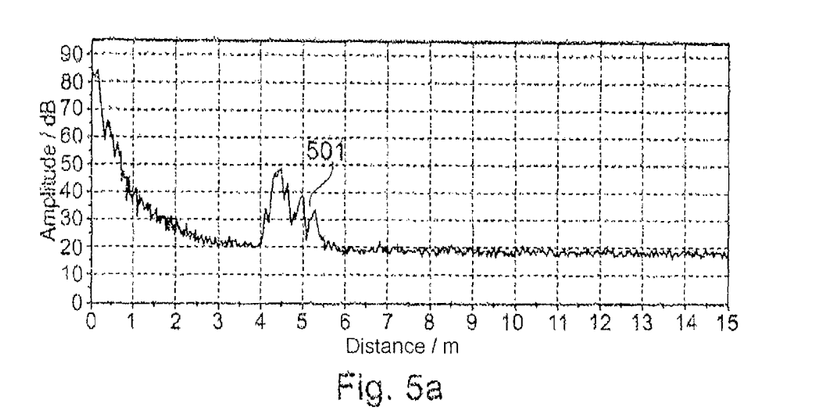
FIGS. 5a, 5b and 5c show echo curves at various points in time according to an exemplary embodiment of the present invention.
Figure 5B:
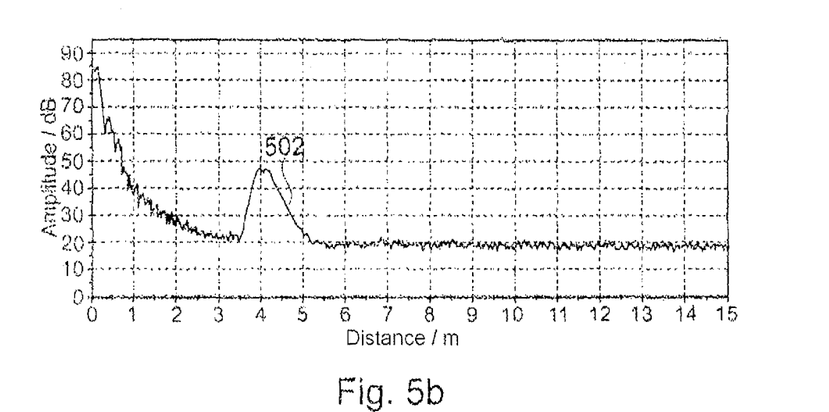
Figure 5C:
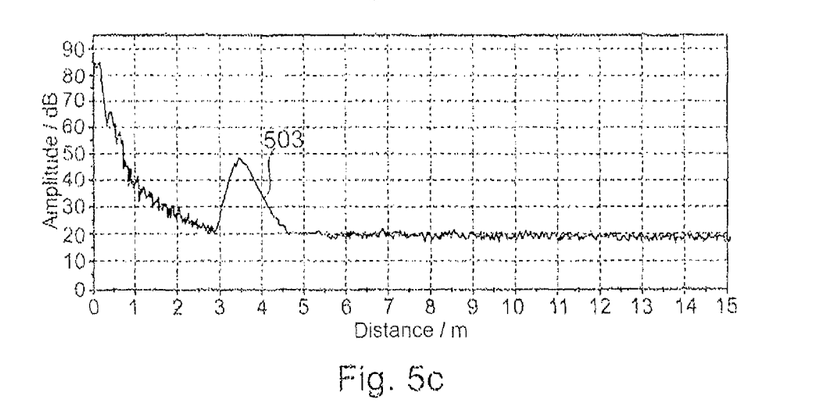

FIGS. 5a to 5c show an example as to how, from several echo curves that were obtained at various points in time without any change in the sensor parameters, further information about the filling material surface can be derived.

The echo curve 503 of FIG. 5c was recorded a few minutes after curve 502 of FIG. 5b was recorded, and the latter in turn was recorded a few minutes after curve 501 of FIG. 5a was recorded.

In this observation period the echo of the fill level moves from a distance of approximately 4.5 m to a distance of approximately 3.5 m. This detected movement of the filling material surface in the direction of the sensor allows an unequivocal conclusion that the container is being filled. From this, in turn, corresponding to the distance of the movement, the formation of one or several charge cone/s of greater or lesser height can be deduced. If further environmental conditions are known, such as the type of filling material, the type and position of filling, and the container geometry, then the topography of the filling material surface can be reconstructed very well.

Conversely, discharge and the formation of a discharge funnel can, of course, also be assumed when a filling material movement away from the sensor is detected.

Figure 6A:
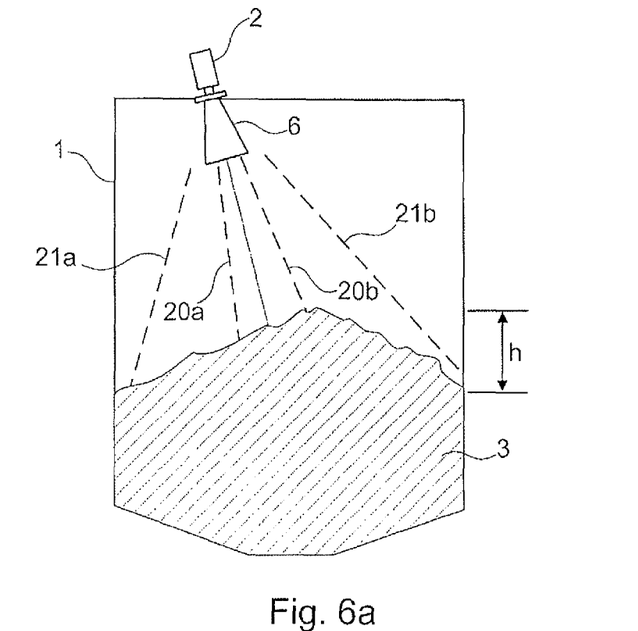
FIGS. 6a, 6b and 6c show a measuring arrangement as well as two echo curves in various resolution cells with differently-focusing antennae according to an exemplary embodiment of the present invention.
Figure 6B:
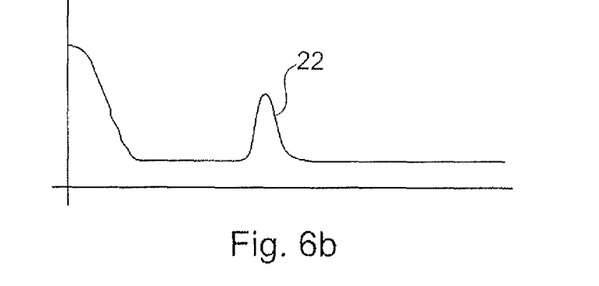
Figure 6C:
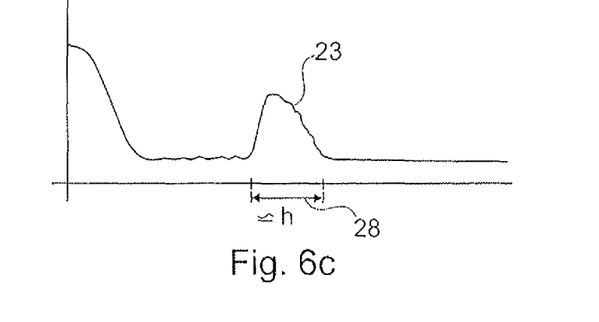

FIGS. 6a, 6b and 6c show an example as to how measuring echo curves from various resolution cells and subsequent evaluation of the echo shapes make it possible to make a statement about the shape of the filling material surface.

FIG. 6a, analogously to FIG. 1, diagrammatically shows a container 1 with filling material 3 and a transit-time sensor 2 that measures from the container ceiling, with the antenna 6 of said transit-time sensor 2 being aligned in the direction of the container centre. The angle of emission of the sensor 2 is variable, e.g. either by changing the antenna parameters or by varying the transmission frequency.

The dotted lines 20a and 20b indicate the 3 dB angle of emission of a tightly focusing antenna, while the dashed lines 21a and 21b indicate the angle of emission of a less strongly focusing antenna. The echo curve in FIG. 6b results from a first measuring procedure with the more tightly focusing antenna and predominantly comprises reflections 22 from the centre of the container. In contrast to this the echo curve in FIG. 6c results from a second measuring procedure with the less well focusing antenna; it comprises reflections 23 from the entire filling material surface. Accordingly, from the echo curve in FIG. 6b the fill height in the centre of the container can be determined, while from the echo curve in FIG. 6c the height h of the bulk position can be determined. This height h approximately corresponds to the length of the arrow 28.

A similar example is shown in FIGS. 7a to 7d. In a manner that is different to that of FIG. 6, in FIGS. 7a to 7d the antenna can be changed so that two different ellipsoid illumination zones on two axes that are arranged so as to be perpendicular to each other can be set. In the sectional drawing FIG. 7b the illumination zones within the container 1 are shown as ellipses 24 and 25. In the bulk position according to FIG. 7a, a first measuring procedure with an illumination zone according to ellipse 24 results in a relatively narrow echo 26, shown in FIG. 7c, while a second measuring procedure with the illumination zone 25 results in an echo curve according to FIG. 7d with a wider echo 27. From the two echo shapes it is then possible to estimate the height of the bulk position and the spatial orientation of the reflection plane. In the case of a short echo in the first measuring procedure, and a longer echo in the second measuring procedure, the bulk position is such that its plane is inclined on an axis that approximately corresponds to the longer axis of the ellipse of the illumination of the first measuring procedure.

Figure 7A:
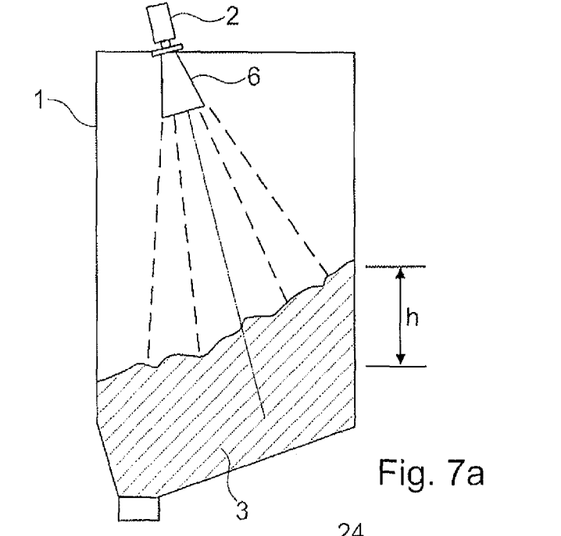
FIGS. 7a, 7b, 7c and 7d show a measuring arrangement, illumination zones within the container, as well as two receiving signals according to an exemplary embodiment of the present invention.
Figure 7B:
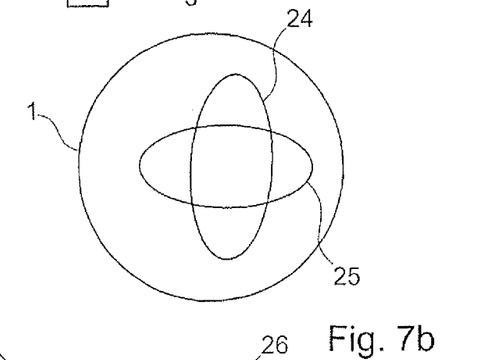
Figure 7C:
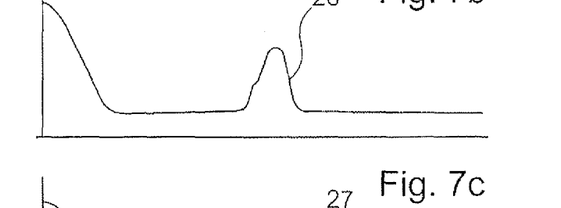
Figure 7D:
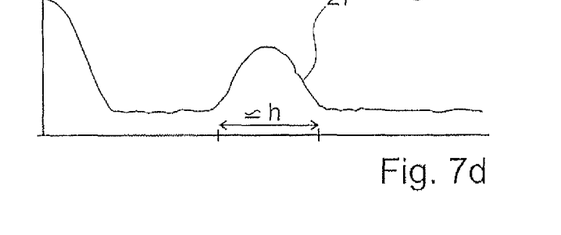

If there are two short echoes from both measuring procedures, the presence of a largely flat surface can be assumed, while if there are two longer echoes, the presence of a charge cone or a discharge funnel is to be assumed.

Figure 8:
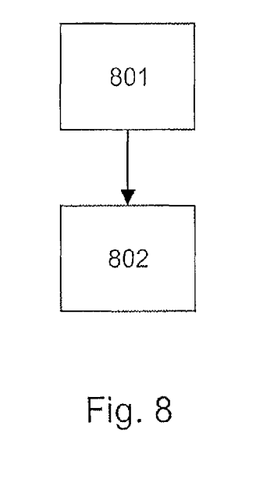
FIG. 8 shows a flow chart of a method according to an exemplary embodiment of the present invention.

FIG. 8 shows a flow chart of a method for determining the fill level of a filling material in a container, in which method in step 801a receiving signal reflected by the filling material surface is received, and in step 802 information about the topography of the filling material surface is determined on the basis of the shape of the receiving signal.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

What is claimed is:

1. A fill-level measuring device for measuring a fill level of a filling material in a container, comprising:
   one of a single sound transducer or a single antenna emitting a signal to a filling material surface and receiving a receiving signal reflected by the filling material surface; and
   a computing unit configured to determine if there is a charge cone of the filling material or a discharge funnel of the filling material;
   wherein the computing unit is configured to determine a height of the charge cone as a function of a length of an echo curve, the length of an envelope curve or the length of an amplitude profile of the receiving signal,
   wherein the fill-level measuring device is one of a fill level radar or an ultrasound fill level sensor,
   wherein the decision as to whether a discharge funnel or a charge cone is present is derived from at least one of:
   a) a shape of the echo by a comparison of the position of a maximum within the echo with the position of the echo beginning A and the position of the echo end E,
   wherein, if the maximum is close to the left side of the echo, the computing unit decides that there is the charge cone, and
   wherein, if the maximum is close to the right side of the echo the computing unit decides that there is the discharge funnel, or
   b) a direction of movement of the filling material surface,
   wherein, if the filling material surface moves in the direction of the container top, the computing unit decides that there is the charge cone, and
   wherein, if the filling material surface moves away from the container top, the computing unit decides that there is the discharge funnel.

2. The fill-level measuring device according to claim 1, wherein the fill-level measuring device is a transit-time fill-level sensor.

3. The fill-level measuring device according to claim 1, wherein the computing unit is further configured to determine a depth of a discharge funnel as a function of a length of the echo curve.

4. The fill-level measuring device according to claim 1, wherein the computing unit determines the information concerning the topography of the filling material surface by utilizing further information which relates to a measuring environment.

5. The fill-level measuring device according to claim 1, further comprising:
   a memory unit storing the further information following a manual input by a user.

6. The fill-level measuring device according to claim 1, wherein the computing unit determines one of (a) a height of a charge cone and (b) a depth of a discharge funnel as a function of several echo curves that have been received at various points in time but that otherwise correspond.

7. The fill-level measuring device according to claim 1, wherein the computing unit determines the information about the topography of the filling material surface as a function of several echo curves of the filling material surface that have been received at various points in time but that otherwise correspond and wherein transmission signals that correspond to the echo curves in each case have been generated with different sensor parameters.

8. The fill-level measuring device according to claim 7, wherein the different sensor parameters are at least one of frequencies of the emitted transmission signals and polarizations of the emitted transmission signals.

9. A method, carried out by a fill level measuring device, for determining a fill level of a filling material in a container, comprising:
   receiving a receiving signal by a single receiver, the receiving signal being reflected by a filling material surface;
   determining if there is a charge cone of the filling material or a discharge funnel of the filling material; and
   determining information about a height of the charge cone of the filling material as a function of a length of an echo curve, the length of an envelope curve or the length of an amplitude profile of the receiving signal;
   wherein the fill-level measuring device is one of a fill level radar or an ultrasound fill level sensor, wherein the step of determining as to whether a discharge funnel or a charge cone is present is performed by a processor as a function at least one of:
   a) a shape of the echo by a comparison of the position of a maximum within the echo with the position of the echo beginning A and the position of the echo end E,
   wherein, if the maximum is close to the left side of the echo, the charge cone is present,
   wherein, if the maximum is close to the right side of the echo, the discharge funnel is present, or
   b) a direction of movement of the filling material surface,
   wherein, if the filling material surface moves in the direction of the container top, the charge cone is present,
   wherein, if the filling material surface moves away from the container top, the discharge funnel is present.

* * * * *